May 15, 1945. H. O. SHIELDS 2,376,094
APPARATUS FOR CONDITIONING COTTON SEED
Filed Oct. 27, 1943 2 Sheets-Sheet 1

INVENTOR
HARDIN O. SHIELDS.
BY
ATTORNEY

May 15, 1945. H. O. SHIELDS 2,376,094
APPARATUS FOR CONDITIONING COTTON SEED
Filed Oct. 27, 1943 2 Sheets-Sheet 2

INVENTOR
HARDIN O. SHIELDS.
BY
ATTORNEY

Patented May 15, 1945

2,376,094

UNITED STATES PATENT OFFICE 2,376,094

APPARATUS FOR CONDITIONING COTTON SEED

Hardin O. Shields, Abilene, Tex., assignor to The Texas Company, New York, N. Y., a corporation of Delaware Application October 27, 1943, Serial No. 507,801

7 Claims. (Cl. 19—66)

This invention relates to a method and apparatus for treating material such as seed-cotton prior to ginning at a cotton gin, and cotton seed prior to delinting in a cotton seed oil mill. The invention contemplates the application of a conditioning agent such, for example, as oil or an oil compound to the cotton fibers or lint on the seed in order to render them less brittle and less likely to break during the several operations to which they are subject both in the gins and in the cotton seed oil mills. By so treating the fibers, it is possible to produce a better sample at the gin and a better grade of lint in the cotton side oil mill where the short fibers remaining on the seeds are removed. The invention will be more clearly understood if brief reference is made to the usual method of handling and treating seed-cotton and cotton seed.

Seed-cotton when picked may have intermingled with it certain extraneous matter such as portions of the cotton plants, including leaves, burs and stems, and such foreign matter as sticks, weeds and trash, and it may also contain some sand or dirt. Ordinarily, seed-cotton is subjected to certain precleaning and extracting processes involving the use of dryers, cleaners and extractors which are intended to remove this extraneous and foreign matter. Following this precleaning, the seed-cotton is passed to gin stands where the long fibers are separated from the seed. This long fiber is that which is baled and subsequently used in the manufacture of textiles. From the gin stands the seeds which still retain short lengths of fibers are removed to oil mills for further treatment. At the oil mills the cotton seed may be stored in a seed house anywhere from a matter of months to two years, and during the period of storage the short cotton fibers left on the seeds are apt to become very dry and brittle and are therefore easily broken so that in the subsequent handling, as in the cleaning operation, these short fibers may be broken and lost in what is known as lint dust.

When the cotton seeds are being prepared for crushing they are removed from the seed house to a cleaning room generally by means of a continuously moving conveyor which extends the entire length of the seed house and into the cleaning room, where they are subjected to the action of what are known as linters. The linters, which are generally similar to gin stands, act upon the seeds to remove the remaining short lengths of fibers in the form of lint. The lint from the linter stands is removed from the saws by a system of brushes, vacuum, or any other desired manner, the lint being rolled off in a soft roll and baled in much the same manner as cotton. These short fibers removed by the linter saws are frequently used in the manufacture of explosives, synthetic fiber, mattresses, etc.

With the foregoing in mind, the present invention has for an object to provide a method and apparatus for conditioning the fibers on either seed-cotton before entering the gin stands, or cotton seed before entering the linter stands to make it possible to produce a better sample of either long fibers or lint, and by so treating the fibers to reduce the lint dust and fly at the points of operation and produce more healthy working conditions for the operators. With a reduction of fly it is, of course, possible to produce a greater amount of lint from a given number of tons of seed. Furthermore, the application of the conditioning agent to either the long or short fibers renders them more pliable, keeps the gin and linter saws in more efficient operating condition and therefore prolongs their serviceable life while at the same time reducing power consumption. Also, by reducing the fly in the cotton seed oil mill, belt life is increased because flying lint dust on the belts causes slipping and wear, and the efficiency of operation of other equipment is improved. At the same time, the application of the conditioning agent eliminates or at least substantially reduces the formation of static electricity and by so doing minimizes the danger of fire in the mill.

For the purpose of illustration, the invention will be described with reference to the application of a conditioning agent (hereinafter referred to as oil) to cotton seed in a cotton oil mill, but it will be understood that the same apparatus is equally suitable for use for treating seed-cotton in cotton gins.

Other objects, features and advantages of the invention will appear from the following description and by reference to the accompanying drawings in which.

Figure 1:
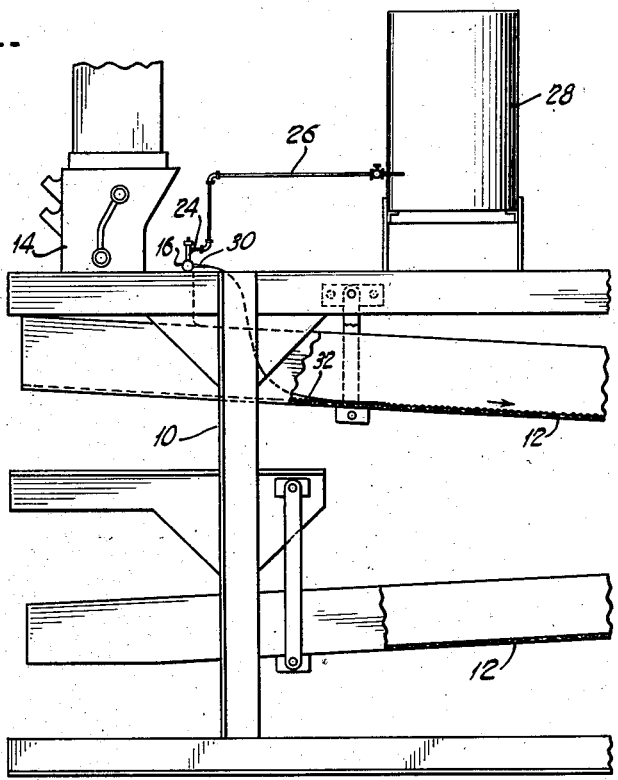
Figure 1 is a view in side elevation of a portion of a typical seed-cleaning unit on which an apparatus embodying the present invention is installed.
Figure 2:
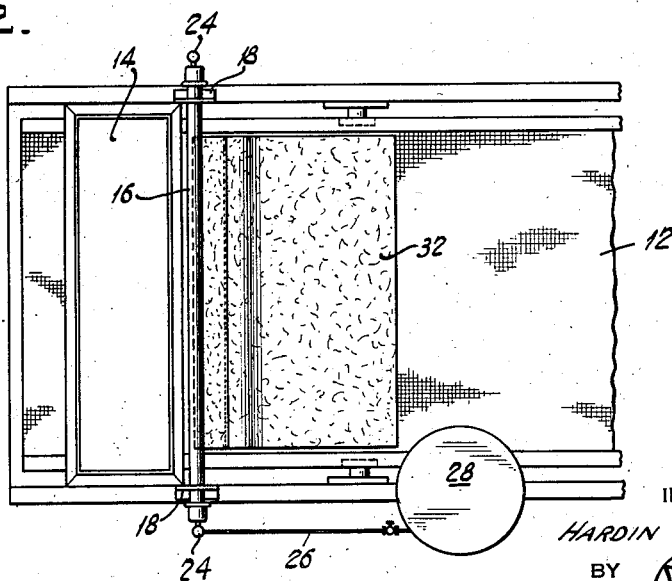
Figure 2 is a plan view of the apparatus shown in Figure 1.
Figure 3:
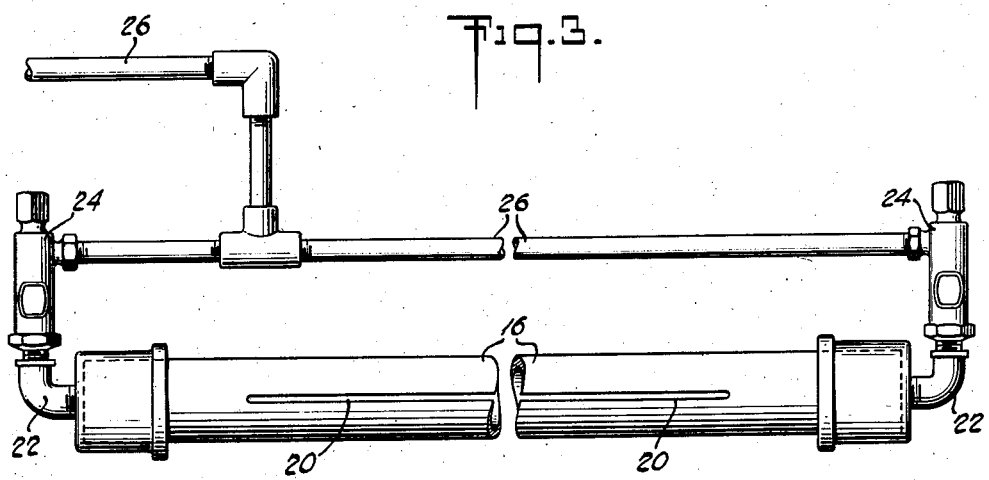
Figure 3 is an enlarged view of the manifold assembly which, as shown in Figures 1 and 2, is mounted above the shaker screen of the seed-cleaning unit.
Figure 4:
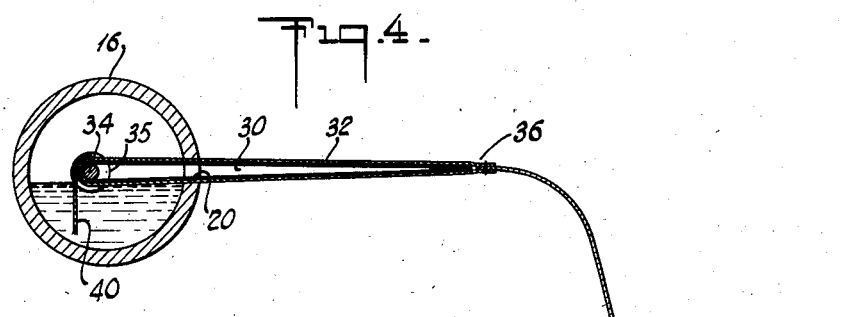
Figure 4 is an enlarged sectional view of the manifold with the wiper-type wick in operative position.

In Figure 1 of the drawings there is illustrated a portion of a seed-cleaning unit having a supporting frame indicated generally by the reference character 10, and inclined screens 12, 12 suspended from the framework. Provision is made for producing a shaking movement of the screens so that seeds thereon will move forward and downwardly in a relatively thin layer, but as the screen shaking mechanism constitutes no part of the present invention it will not be described. For present purposes it is sufficient to say that the seeds are fed in regulated quantities to the uppermost shaker screen 12 from a hopper 14 which extends across the width of the screen.

The apparatus which constitutes the subject matter of the present invention includes a manifold 16 which is disposed in a horizontal position slightly above and across a section of the shaker screen 12, preferably the uppermost section. The manifold 16 is maintained in position by means of clamps 18, 18 attached to it near its opposite ends and themselves secured to the frame 10. The manifold 16 is provided throughout a greater portion of its length with a narrow longitudinal slot 20 which is at least coextensive in length with the width of the shaker screen 12. Each end of the manifold 16 connects through a pipe elbow 22 with a sight feed needle valve 24 and the two needle valves in turn connect through suitable piping indicated generally by the reference character 26 with a tank or reservoir 28 which contains the fiber conditioning fluid or oil and which is mounted on the frame 10, or elsewhere in proximity to the frame, at such a height as to insure sufficient hydrostatic pressure to provide a continuous flow of the oil to the needle valves 24, 24 and ultimately to the manifold 16.

A cage-like member 30, which in cross section is somewhat wedge-shaped so as to have both a larger chambered section and a restricted section and which preferably is composed of a woven or perforated material such as small mesh wire screening, is disposed in the slot 20 in the manifold 16 with the larger chambered section within the manifold and the restricted section projecting outwardly. The cage-like member 30 is completely covered with a flexible, absorbent material such as flannel which constitutes a wiper type wick 32.

The selection of suitable material for the cage-like member 30 is important because the movement of oil to the wick 32 can be quite accurately regulated by using screening of suitable gauge or other material having a degree of porosity to permit only the desired amount of oil to pass through. Thus dual regulation of the supply of oil to the wick is obtained, first by means of the sight feed needle valves 24, 24 and secondly, by proper selection of the material of which the cage-like member 30 is made.

A section of the wick 32 projects beyond the end of the restricted portion of the cage-like member 30 and extends in a downward direction so that its free surface which constitutes a wiper, can make wiping contact with the shaker screen 12 or the seed thereon. The chambered section of the cage 30, because of its shape and rigidity, acts to hold the wick 32 in the slot 20, and at the same time exposes a relatively large surface of the wick to the conditioning fluid in the manifold 16. A rod 34 extends longitudinally through the chambered section of the member 30 and prevents that section from collapsing and being pulled through the slot 20 or restricting the flow of fluid. If desired, collars 35, 35 can be secured to the ends of the rod 34 to prevent the rod from becoming seated in the slot 20 and thus tending to cut off the flow of fluid through the slot 20. At the point where the restricted section of the member 30 terminates as indicated by the reference character 36, the upper and lower sections of the flexible, absorbent material are stitched together and beyond that point a single layer of the absorbent material of which the wick 32 is composed projects downwardly with its free surface, constituting a wiper in a position to be contacted by the seeds on the screen 12 as the seeds are moved down the shaker screen.

Figure 5:
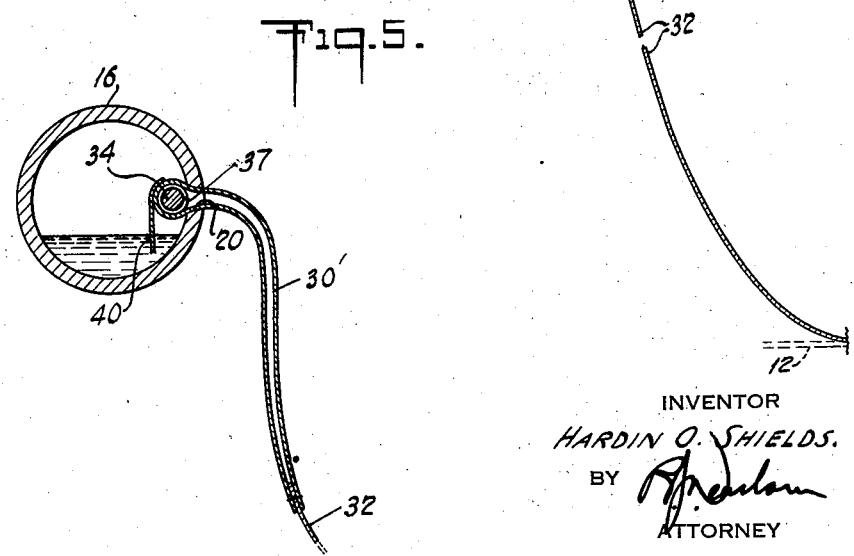
Figure 5 is another enlarged sectional view of the manifold with a modified form of wiper type wick in operative position.

In a modified form of the invention as shown in Fig. 5, the wire cage-like member 30 is not used, but instead one end of the absorbent wiper 32 is folded back on itself to form a chambered member 30' which also extends into the manifold 16 and is held in operative position therein by a rod such as rod 34, or by one having an annularly furrowed or grooved surface as shown at 37 and whose diameter is greater than the width of the slot 20. The furrows or grooves in the surface permit the free passage of oil around the rod to the absorbent wick while at the same time the presence of the rod prevents the chambered portion 30' of the wick from being pulled into and perhaps through the slot 20. Also all possibility that the rod might move into a position to close the slot is eliminated.

In some instances it is desirable to operate with a low oil level in the manifold 16, and in order to insure a continuous supply of oil to the wick 32 when so operating an elongated absorbent fabric flap 40 is secured to the fabric of the cage-like member 30 and is allowed to hang downwardly into the oil in the manifold 16 from which the oil is supplied by capillary action to the wick 32. Thus, regardless of the level of the oil in the manifold a constant supply to the wick is assured.

When the above described apparatus is mounted in operative position on the frame 10 of a seed-cleaning unit, the reservoir 28 is filled with the oil or oil compound, or other fluid, which is to be applied to the cotton seeds. The rate of flow of the oil from the reservoir 28 through the piping 26 to the manifold 16 is regulated and controlled by the sight feed needle valves 24, 24. By proper adjustment of these valves, the desired amount of oil can be supplied by gravity to the manifold 16, the oil flowing to the manifold due to the hydrostatic pressure on the oil in the reservoir. When the oil in the manifold 16 reaches the proper height it saturates the portion of the wick 32 which extends into the manifold and capillary action causes the oil to be distributed uniformly throughout the entire area of the wick 32. The oil-saturated wiper section of the wick contacts the relatively dry cotton seed on the shaker screen 12 and due to the contact of the wick with the seed, a small quantity of oil is transferred from the wick to the fibers on the seed. Substantially all of the fibers on the seed receive an application of oil from the wiper portion of the wick due to the character of the material of which the wick is composed which enables it to flex and conform to the irregularities in the surface of the layer of seeds on the screen. The shaking of the screens maintains a continuous forward and downward movement of the layer of seeds in contact with the wiper section of the wick 32 and finally the treated seeds are conveyed to the linters where the seeds are delinted.

As previously stated, the apparatus which constitutes the subject matter of this invention is likewise adapted for use in cotton gins for treating seed cotton prior to the ginning operation, and when so used the manifold 16 is mounted, for example, in the discharge end of a cleaner and the application of the oil or oil compound is made to the seed cotton in substantially the same manner as herein described prior to its entry into the gin stands.

Obviously, many modifications and variations may be made in the invention as herein set forth without departing from the spirit and scope thereof, and therefore only such limitations should be imposed as are indicated in the appended claims.

I claim:

1. In combination with the inclined shaker screen of a seed cleaning apparatus, means for applying a liquid conditioning agent to the seed on said screen comprising a manifold disposed above and transversely of said screen and formed with a longitudinally extending slot in the wall thereof, means for maintaining a constant supply of the conditioning agent to said manifold, and a flexible absorbent wick having one edge extending through the slot in said manifold and into the conditioning agent therein and the opposite edge depending to the shaker screen whereby the seed on said screen is caused by the shaking action of the screen to pass in wiping contact with said wick and minute quantities of the conditioning agent thereon to be transferred from the wick to the seed.

2. In combination with the inclined shaker screen of a seed cleaning apparatus, means for applying a liquid conditioning agent to the moving seed on said screen comprising a manifold disposed above and transversely of said screen and formed with a longitudinally extending slot in the wall thereof, means for maintaining a constant and regulated supply of the conditioning agent in said manifold, a flexible absorbent wick having one edge extending through the slot into said manifold and the opposite edge depending to the shaker screen whereby seed on said screen is caused by the shaking action of the screen to move in wiping contact with said wick and minute quantities of the conditioning agent thereon to be transferred from the wick to the seed, and an absorbent flap depending from said wick in said manifold into the oil therein to insure a constant supply of oil to the wick regardless of the oil level within the manifold.

3. In combination with the inclined shaker screen of a seed cleaning apparatus, means for applying a liquid conditioning agent to the moving seed on said screen comprising a manifold disposed above and transversely of said screen and formed with a longitudinally extending slot in the wall thereof, means for maintaining a constant and regulated supply of the conditioning agent to said manifold, a flexible absorbent wick having one end extending into the manifold and therein folded to form a chambered section and the opposite end depending to the shaker screen, and an elongated rod having an annularly furrowed surface extending through the chambered section of the wick to prevent the walls thereof from collapsing when saturated with oil while permitting the unrestricted passage of oil through said furrows to the wick which is thereby saturated with oil which is transferred therefrom to the seed as the latter is caused to pass in wiping engagement past the wick by the action of the shaker screen.

4. In combination with the inclined shaker screen of a seed cleaning apparatus, means for applying a liquid conditioning agent to the moving seed on said screen comprising a manifold disposed above and transversely of said screen and formed with a longitudinally extending slot in the wall thereof, said slot being co-extensive in length with the width of the shaker screen, means for maintaining a constant and regulated supply of the conditioning agent to said manifold, a wedge-shaped cage-like member composed of rigid woven material disposed in the slot in said manifold with its enlarged chambered section positioned within the manifold and its restricted section projecting outwardly therefrom, a flexible absorbent wick having one end extending into the manifold and enveloping the cage-like member and contacting the conditioning agent in the manifold and the opposite end depending to the shaker screen, and an elongated rod extending through the chambered portion of the cage-like member for maintaining said member in position whereby conditioning fluid is constantly fed to said wick from said manifold and is transferred therefrom in minute quantities to the seed as the latter is caused to pass in wiping engagement against the wick by the action of the shaker screen.

5. In combination with the inclined shaker screen of a seed cleaning apparatus, means for applying liquid conditioning agent to the seed on said screen comprising a manifold disposed above said screen and having a longitudinally extending slot in the wall thereof, means for supplying a conditioning agent to said manifold, and an absorbent wick having one end extending through said slot and into the conditioning agent in said manifold and the opposite end depending to the shaker screen whereby the seed on said screen is caused to pass in wiping contact with said wick and minute quantities of the conditioning agent thereon to be transferred from the wick to the seed.

6. In combination with the inclined shaker screen of a seed cleaning apparatus, means for applying liquid conditioning agent to the seed on said screen comprising a manifold disposed above said screen and formed with a longitudinally extending slot in the wall thereof, means for maintaining the conditioning agent to the manifold under hydrostatic pressure sufficient to provide a continuous flow of the conditioning agent to the manifold, a wick extending through the slot in said manifold so that one end is in contact with the conditioning agent therein while the other end depends to the shaker screen whereby seed on said screen is caused to pass in wiping contact with said wick and minute quantities of the conditioning agent carried by the wick to be transferred from the wick to the seed.

7. In combination with the inclined shaker screen of a seed cleaning apparatus, means for applying liquid conditioning agent to the seed on said screen comprising a manifold disposed above the screen and having a longitudinally extending slot in the wall thereof, means for continuously supplying a conditioning agent to the manifold, an absorbent wick having one end extending through the slot in the manifold and into the conditioning agent therein and the opposite end depending to the shaker screen to make wiping contact with the seed on said screen, an elongated rod disposed in the manifold for supporting the end of the wick therein, and means on opposite ends of said rod for holding the rod away from the inside wall of the manifold to prevent the rod from cutting off the flow of conditioning agent through the slot.

HARDIN O. SHIELDS.